United States Patent [19]

Kato et al.

[11] 4,399,261

[45] Aug. 16, 1983

[54] CURABLE COMPOSITION

[75] Inventors: Yasushi Kato; Hisao Furukawa, both of Kobe, Japan

[73] Assignee: Kanegafuchi Kagaku Kogyo Kabushiki Kaisha, Osaka, Japan

[21] Appl. No.: 328,910

[22] Filed: Dec. 9, 1981

[30] Foreign Application Priority Data

Dec. 19, 1980 [JP] Japan ................................ 55/181147

[51] Int. Cl.³ .............................................. C08F 8/32
[52] U.S. Cl. .................................. 525/342; 525/326.5
[58] Field of Search ........................................ 525/342

[56] References Cited

U.S. PATENT DOCUMENTS 4,191,713  3/1980  Yonezawa et al. ................ 525/102

*Primary Examiner*—Joseph L. Schofer
*Assistant Examiner*—Bernard Lipman
*Attorney, Agent, or Firm*—Moonray Kojima

[57] ABSTRACT

A curable composition which comprises (A) a silyl group containing vinyl resin which has a main chain consisting essentially of vinyl polymer and has in one molecule at least one silicon atom connected to a hydrolyzable group on the terminal or side chain, (B) a tin compound, and (C) an amine or a mixture of two or more amines having in one molecule at least one silicon atom connected to a hydrolyzable group. The composition is useful as a coating material, adhesive, sealant, paints, and the like.

11 Claims, No Drawings

CURABLE COMPOSITION

BACKGROUND OF THE INVENTION

1. Field of Invention

This invention relates to a curable composition comprising a vinyl resin having hydrolyzable silyl groups on the terminals or side chains and a curing agent; and more particularly to such curable composition having excellent adhesion to organic substances.

2. Description of the Prior Art

In prior Japanese application Ser. No. 36,395/1979, the inventors have disclosed a vinyl resin having hydrolyzable groups on the terminals or side chains, which exhibit such outstanding properties as high gloss, weather resistance, and color fastness, which properties are inherent in vinylresins, and which also has improved adhesion to inorganic substances, which is attributable to the hydrolyzable silyl group. In addition, the hydrolyzable silyl groups give rise to cross linking on reaction with moisture in the ambient atmosphere, and the resulting network structure is responsible for such improved properties as improved solvent resistance, water resistance, heat resistance, high hardness and weather resistance.

A vinyl resin having hydrolyzable silyl groups generally cures without any curing agent; however, in that case curing requires heating to a high temperature, or such curing is slow at low temperatures. Thus, usually a curing agent is employed with such resin so that good results of curing are obtained. A vinyl resin having hydrolyzable silyl groups usually has very good adhesion to inorganic substances owing to the hydrolyzable silyl groups, but, disadvantageously, is poor in adhesion to organic substances.

Thus, in the prior art, there is an unsatisfied need for a vinyl resin having hydrolyzable silyl groups which can adhere well to organic substances.

SUMMARY OF THE INVENTION

Accordingly, an object of the invention is to overcome the aforementioned and other disadvantages and deficiencies of the prior art.

Another object is to provide a vinyl resin having hydrolyzable silyl groups which can adhere well to organic surfaces.

After extensive study, the inventors have discovered that a vinyl resin having hydrolyzable silyl groups can be greatly improved in adhesion to organic substances when a special class of amines, as set forth herein, is added to a blend of the vinyl resin and a tin compound used as a curing compound.

This invention, thus, encompasses a curable composition comprising (A) a silyl group containing vinyl resin which has a main chain consisting essentially of vinyl polymer and has in one molecule at least one silicon atom connected to a hydrolyzable group on the terminal or side chain; (B) a tin compound; and (C) an amine or a mixture of two or more amines, having in one molecule at least one silicon atom connected to the hydrolyzable group. The composition is usable as coating agent, or material, sealant, and the like, and when applied to an organic surface adheres well.

A feature of this invention is a curable composition comprising a blend consisting essentially of a vinyl resin having one or more hydrolyzable groups, a tin compound, and one or more amines having in one molecule at least one silicon atom connected to a hydrolyzable group.

DETAILED DESCRIPTION OF PREFERRED EMBODIMENTS

The vinyl resin (A) used in the invention, comprises a main chain consisting essentially of vinyl resin and one or more hydrolyzable silyl groups attached to its terminals or side chains. The hydrolyzable silyl group has at least one, preferably two or more, silicon atoms, and is represented by the formula:

wherein X is a hydrolyzable group; $R_1$ and $R_2$ are hydrogen, or alkyl group, aryl group, or aralkyl group having 1 to 10 carbon atoms; and n is an integer of 1,2 or 3.

The silyl group containing vinyl resin, which is used in the invention, can be produced by various methods. The preferred industrial methods of producing same, include (A) hydrosilylation of a vinyl resin having carbon-carbon double bonds with hydrosilane; and (B) copolymerization of a vinyl compound and a silyl compound having polymerizable double bonds. Each of these methods will be described hereinbelow in greater detail.

Method (A)

The silyl group containing vinyl resin according to the present invention, can be readily produced by reacting a hydrosilane compound and a vinyl resin having carbon-carbon double bonds in the presence of a catalyst of Group VIII transition metal. The hydrosilane used in this invention has the following formula:

wherein $R_1$ is a monovalent hydrocarbon group selected from the group consisting of alkyl group, aryl group and aralkyl group having 1 to 10 carbon atoms: X is a group selected from the group consisting of halogen, alkoxy, acyloxy, aminoxy, phenoxy, thioalkoxy, ketoxymate, alkenyloxy, and amino groups; and n is an integer of 1, 2 or 3.

Examples of the hydrosilane compounds represented by formula (2) include halogenated silanes, such as methyldichlorosilane, trichlorosilane, and phenyl dichlorosilane; alkoxysilanes, such as methyldiethoxysilane, methyldimethoxysilane, phenyldimethoxysilane, trimethoxysilane, and triethoxysilane; acyloxy silane, such as methyldiacetoxysilane, phenyldiacetoxysilane, and triacetoxysilane; ketoxymate silane, such as bis(dimethylketoxymate)methylsilane, and bis(cyclohexylketoxymate)methylsilane; alkenyloxysilane, such as methyldiisopropenoxysilane, and triisopropenoxysilane; and other silanes, such as methyldiaminoxysilane, triaminoxysilane, methyldiaminosilane and triaminosilane.

The hydrosilane compound can be used in any amount, preferably in an amount of from 0.5 to 2 times as many moles as the carbon-carbon double bonds. Hydrosilane in excess of this amount may be used, but the excess will substantially remain unreacted and hence will be recoverable as unreacted hydrosilane.

According to the instant invention, the hydrosilane compound can be readily substituted with highly reactive halogenated silanes which are inexpensive raw materials. The silyl group containing vinyl resin obtained from the halogenated silane cures rapidly at room temperature when exposed to the moisture in, for example, ambient atmosphere, giving off hydrogen chloride. Such vinyl resin has limited uses because the liberated hydrogen chloride has an irritating odor and causes corrosion to nearby articles. Thus, it is desirable to replace the halogen functional group with other hydrolyzable functional group.

The vinyl resin used for the method (A) may be any vinyl resin, except those which contain hydroxy groups. Examples of such vinyl resins are those resins whose principal component is a polymer or copolymer of acrylic esters and methacrylic esters such as methyl acrylate, methyl methacrylate, ethyl acrylate, ethyl methacrylate, butyl acrylate, butyl methacrylate, 2-ethylhexyl acrylate, and 2-ethylhexylmethacrylate; carboxylic acids, such as acrylic acid, methacrylic acid, itaconic acid, and fumaric acid; acid anhydrides, such as maleic anhydride; epoxy compounds, such as glycidyl acrylate, glycidyl methacrylate; amino compounds, such as diethylaminoethyl acrylate, diethylaminoethyl methacrylate, and aminoethylvinyl ether; amide compounds, such as acrylamide, methacrylamide, diamide itaconate, alpha ethylacrylamide, crotone amide, diamide fumarate, diamide maleate, N-butoxymethyl acrylamide, and N-butoxymethyl methacrylamide; and acrylonitrile; iminol methacrylate, styrene, alpha methyl styrene, vinyl chloride vinyl acetate, and vinyl propionate.

The carbon-carbon double bonds necessary for hydrosilylation may be introduced into the terminals or side chains by radical copolymerization of allyl acrylate, allyl methylacrylate, diallylphthalate, etc., into the vinyl resin during polymerization or copolymerization of the above-listed vinyl compounds. The quantity of monomer for this purpose may be determined according to the number of silyl groups required in the object resin. In addition, the molecular weight may be adjusted by adding a chain transfer agent, such as n-dodecyl mercaptan and t-dodecylmercaptan. The polymerization of these vinyl compounds can be accomplished in the presence or absence of solvent.

The reaction of hydrosilyl compound with a carbon-carbon double bond requires a catalyst of transition metal complex compound. Such transition metals include platinum, rhodium, cobalt, palladium, nickel, and are selected from Group VIII elements. The hydrosilylation is accomplished at any temperature from 50° to 100° C. and within a period of time of from 1 to 10 hours.

Method (B).

The method employs radical polymerization of a vinyl compound and a silane compound represented by the formula:

wherein $R_1$ is a monovalent hydrocarbon group selected from alkyl group, aryl group, or aralkyl group; $R_2$ is an organic residue having a polymerizable double bond; X is a group selected from halogen, alkoxy, acyloxy, aminoxy, phenoxy, thioalkoxy, ketoxymate, alkenyloxy, and amino groups; and n is a integer of 1, 2 or 3.

The silane compounds used in this invention include, for example:

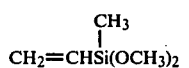

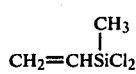

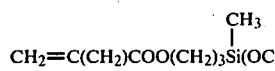

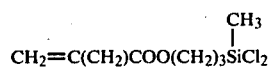

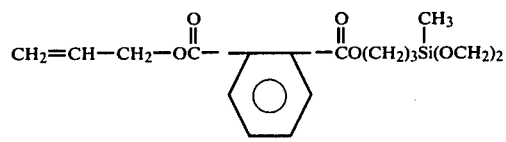

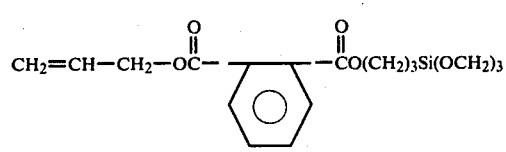

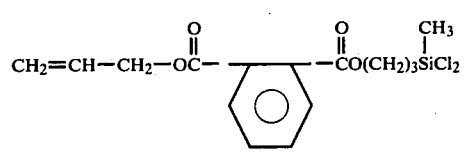

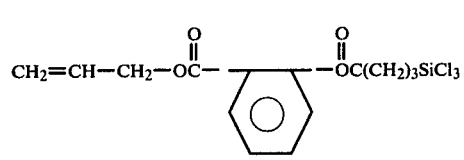

These silane compounds are produced by various methods, for example, by reacting acetylene, allyl acrylate, allyl methacrylate, or diallyl phthalate with methyl dimethoxysilane or methyl dichlorosilane or trimethoxysilane or trichlorosilane, in the presence of a Group VIII transition metal catalyst.

The vinyl compound used in this invention includes the compounds used for the preparation of the vinyl resin in the above method (A). In addition to those compound mentioned in method (A), the following vinyl compounds containing hydroxyl groups may be used: 2-hydroxyethyl acrylate, 2-hydroxyethyl methacrylate, 2-hydroxypropyl acrylate, 2-hydroxypropyl methacrylate, 2-hydroxyvinyl ether, N-methylol acrylamide, and "5700" (trade name, made by Toa Gosei Company).

The copolymerization of a vinyl compound and a silane compound is usually accomplished by solution polymerization. A vinyl compound, silane compound, radical initiator, and chain transfer agent, such as n-dodecyl mercaptan and t-dodecyl mercaptan to adjust the molecular weight of the silyl group containing copolymer, are reacted at 50° to 150° C., for a suitable length of time. A solvent may be used, although such use is not necessary. If a solvent is used, it is preferable to use a non-reactive solvent, such as ethers, hydrocarbons, and ethyl acetates.

The silyl group vinyl resin obtained, as mentioned, is composed of a main chain consisting essentially of vinyl polymer and has in one molecule at least one silicon atom connected to the hydrolyzable group on terminals or side chains.

The tin compound (B) used in this inventive composition blend may be any tin compound which is commonly used as a curing agent for compounds containing hydrolyzable silyl groups. Examples of such compounds are:

carboxylic acid type organotin compounds, such as
(n—$C_4H_9$)$_2$Sn(OCOC$_1$H$_{22-n}$)$_2$,
(n—$C_4H_9$)$_2$Sn(OCOCH=CHCOOCH$_3$)$_2$,
(n—$C_4H_9$)$_2$Sn(OCOCH=CHCOOC$_4$H$_{9-n}$)$_2$,
(n—$C_8H_{17}$)$_2$Sn(OCOC$_{11}$H$_{22-n}$)$_2$,
(n—$C_8H_{17}$)$_2$Sn(OCOCH=CHCOOCH$_3$)$_2$,
(n—$C_8H_{17}$)$_2$Sn(OCOCH=CHCOOC$_4$H$_{9-n}$)$_2$,
(n—$C_8H_{17}$)$_2$Sn(OCOCH=CHCOOC$_8$H$_{17}$-iso)$_2$, and
Sn(OCOC$_8$H$_{17-n}$)$_2$.

mercaptide type organotin compounds, such as
(n—$C_4H_9$)$_2$Sn(SCH$_2$COO),
(n—$C_4H_9$)$_2$Sn(SCH$_2$COOC$_8$H$_{17}$-iso)$_2$,
(n—$C_8H_{17}$)$_2$Sn(SCH$_2$COO),
(n—$C_8H_{17}$)$_2$Sn(SCH$_2$CH$_2$COO),
(n—$C_8H_{17}$)$_2$Sn(SCH$_2$COOCH$_2$CH$_2$OCOH$_2$S),
(n—$C_8H_{17}$)$_2$Sn(SCH$_2$COOCH$_2$CH$_2$CH$_2$OCOH$_2$S),
(n—$C_8H_{17}$)$_2$Sn(SCH$_2$COOC$_8$H$_{17}$-iso)$_2$,
(n—$C_8H_{17}$)$_2$Sn(SCH$_2$COOC$_{12}$H$_{25-n}$)$_2$, $$\text{(n-}C_4H_9)\text{Sn(SCH}_2\text{COOC}_8\text{H}_{17}\text{—iso)} \\ \| \\ O \\ \| \\ \text{(n-}C_4H_9)\text{Sn(SCH}_2\text{COOC}_8\text{H}_{17}\text{—iso)}.$$

sulfide type organotin compounds, such as $$\begin{array}{c}(\text{n-}C_4H_9) \\ \phantom{x} \\ (\text{n-}C_4H_9)\end{array}\!\!\!\!\!Sn=S,$$

$$\begin{array}{c}(\text{n-}C_8H_{17}) \\ \phantom{x} \\ (\text{n-}C_8H_{17})\end{array}\!\!\!\!\!Sn=S$$

$$\begin{array}{c}(\text{n-}C_4H_9)\text{—Sn}=S \\ | \\ S \\ | \\ (\text{n-}C_4H_9)\text{—Sn}=S.\end{array}$$

organotin oxides, such as
(n—$C_4H_9$)$_2$Sn,
(n—$C_8H_{17}$)$_2$Sn.

and reaction products of organotin oxides, such as (n—$C_4H_9$)$_2$SnO and (n—$C_8H_{17}$)$_2$SnO and esters, such as ethyl silicate, ethyl silicate 40, dimethyl maleate, diethyl maleate, dioctyl maleate, dimethyl phthalate, diethyl phthalate and dioctyl phthalate.

The amines used in this inventive composition blend are those which contain at least one silicon atom connected to hydrolyzable groups in one molecule, and is not limited in any manner beyond that. Examples of such amines include, for example, silane coupling agents containing amino groups, such as NH$_2$(CH$_2$)$_3$Si(OC$_2$H$_5$)$_3$ and NH(CH$_2$)$_2$NH(CH$_2$)$_3$Si(OCH$_3$)$_3$; reaction products of said coupling agents containing amino groups and a silane coupling agent containing epoxy groups, such as $$CH_2\overset{O}{\overset{\diagup\,\,\diagdown}{\text{———}}}CHCH_2O(CH_2)_3Si(OCH_3)_3 \text{ and}$$

[cyclic structure with O and S]–(CH$_2$)$_2$Si(OCH$_3$)$_3$;

reaction products of said silane coupling agent containing amino groups and a compound containing epoxy groups, such as ethylene oxide, butylene oxide, epichlorohydrin, epoxidized soybean oil, and Epikote 828 and Epikote 1001 (both made by Shell Chemical Co.); reaction products of said silane coupling agents containing epoxy groups and an amine, such as aliphatic amine, for example, ethylamine, diethylamine, triethylamine, ethylenediamine, hexanediamine, diethylenetriamine, triethylenetetramine, and tetraethylenepentamine; aromatic amine, for example, aniline and diphenylamine; alicyclic amine, for example cyclopentilamine, and cyclohexylamine; and ethanol amine;

reaction products of said silane coupling agent containing amino groups and ethyl silicate, ethyl silicate 40, methyl trimethoxysilane, methyltriethoxysilane, vinyltrimethoxysilane, vinyltriethoxysilane, γ-methacryloxypropyltrimethoxysilane, or said coupling agent containing epoxy groups or said silane coupling agent containing amino groups by partial hydrolysis of a compound containing hydrolyzable silyl groups with water and an acid or alkaline catalyst, as required.

The composition of this invention can be further improved in adhesion to organic substance, by adding a compound containing epoxy groups.

The ratio of the components for the inventive composition is not specially limited, but is preferably as follows: 100 parts by weight of a silyl group containing vinyl resin (A) having in one molecule at least one silicon atom connected to a hydrolyzable group on the terminal or side chain; 0.01 to 10 parts by weight, more preferably 0.1 to 8 parts by weight of a tin compound (B); and 0.01 to 20 parts by weight, more preferably 0.1 to 15 parts by weight of amine (C) having in one molecule at least one silicon atom connected to a hydrolyzable group.

The components may be homogeneously mixed or blended using any conventional mixing or blending process, and apparatus.

The component (A), when mixed with the tin compound (B), which is a curing agent, and a specific amine (C) as set forth herein, provides a coating, for example, which has excellent adhesion to organic surfaces, after curing.

On the other hand, a composition which employs components (A) and (B), but without either the specified amine (C) (such as using an amine which is not specified, or using a compound other than an amine), will be poor in adhesion to organic substances. For example, if an amine is used which does not contain a hydrolyzable silyl group, the composition will not adhere well to an organic substrate. Also, if a silane coupling agent containing no amino group is used, the composition will not adhere well to an organic substrate.

The silyl group containing vinyl resin composition of this invention can be cured at room temperature or at low temperatures, and consequently finds use as a paint, coating material, adhesive, sealant, etc. Because of its outstanding adhesion to organic surfaces, as well as outstanding adhesion to inorganic surfaces, the composition of this invention can be applied onto a multitude of surfaces, such as wood, paper, plastics, organic coatings, etc., thereby substantially increasing the market for such substance.

The inventive composition may also be incorporated together with ethyl silicate, which is capable of copolycondensation with the composition of this invention, in order to improve the surface hardness of the coating resulting from the composition. Also, the composition of this invention can be blended with various resins used as a coating material, such as lacquer paint, acrylic lacquer paint, thermosetting acrylic paint, alkyd paint, melamine paint, and epoxy paint, in order to improve the adhesion of such other material and to improve their weather resistance.

The inventive composition can also be incorporated together with various kinds of fillers and pigments, such as, for example, silica, calcium carbonate, magnesium carbonate, titanium oxide, iron oxide, and glass fibers.

In addition to the foregoing applications or uses, the inventive composition may be used as a coating material for aircraft, buildings, automobiles, glass, etc.; and as a sealing compound and surface treatment for inorganic and organic substances.

The invention will now be further illustrated using actual examples. The examples are not to be construed to be limiting in any way of the invention.

PREPARATION OF VINYL RESIN

EXAMPLE 1

Into 90 g of xylene heated to 90° C. were added dropwise, a solution of 2 g azobisisobutyronitrile dissolved in 30 g of styrene, 16 g allyl methacrylate, 20 g methyl methacrylate, 19 g n-butyl methacrylate, 14 g butyl acrylate, 4 g maleic anhydride, and 2 g n-dodecylmercaptan. After reaction for 10 hours, there was obtained a vinyl compound containing allyl unsaturated groups and having a molecular weight of 8,000. The infrared absorption spectrum indicated the absorption by carbon-carbon double bond at 1648 cm$^{-1}$ and the absorption by acid anhydride at 1780 cm$^{-1}$. The resulting polymer solution was stripped of 40 g of solvent under reduced pressure.

To 16 g of a solution of the obtained vinyl copolymer containing allyl unsaturated groups were added 1.5 g methyl dimethoxysilane and an isopropanol solution of 0.0005 g chloroplatinic acid, and the reactants were allowed to react for 6 hours at 90° C. under sealed conditions. The infrared absorption spectrum indicated no absorption at 1648 cm$^{-1}$. Thus, a silyl group containing vinyl polymer was obtained.

EXAMPLE 2

Into 70 g of xylene heated to 90° C. were added dropwise, a solution of 2 g azobisisobutyronitrile dissolved in 30 g styrene, 22 g γ-methacryloxypropyltrimethoxysilane, 22 g methyl methacrylate, 15 g n-butyl methacrylate, 18 g butyl acrylate, and 1 g n-dodecylmercaptan. After reaction for 10 hours, there was obtained a vinyl resin containing silyl groups and having a molecular weight of 12,000.

EXAMPLE 3

Into 70 g of xylene heated to 90° C. were added dropwise, a solution of 2 g azobisisobutyronitrile dissolved in 30 g styrene, 22 g γ-methacryloxypropyltrimethoxysilane, 22 g methyl methacrylate, 15 g n-butyl methacrylate, 18 g butyl acrylate, 4 g acrylamide, 10 g n-butanol and 1 g n-dodecyl mercaptan. After reaction for 10 hours, there was obtained a vinyl resin containing silyl groups and having a molecular weight of 12,000.

EXAMPLE 4

Into 70 g of xylene heated to 120° C. were added dropwise, a solution of 6 g azobisisobutyronitrile dissolved in 30 g styrene, 22 g γ-methacryloxypropyltrimethoxysilane, 22 g methyl methacrylate, 13 g n-butyl methacrylate, 18 g butyl acrylate, 4 g acrylamide, 2 g maleic anhydride, 10 g n-butanol, and 1 g n-dodecyl mercaptan. After reaction for 10 hours, there was obtained a vinyl resin containing silyl groups and having a molecular weight of 6,000.

PREPARATION OF COMPOSITION COMPRISING TIN COMPOUND AND AMINE

The resin solutions obtained in Examples 1, 2, 3, 4, were homogeneously mixed using conventional blending methods, with a tin compound and an amine, as shown in the below Table 1, and then diluted with xylene to a proper viscosity (Ford cup 15 seconds), to prepare a coating material. The resulting coating material was applied to organic films as shown in Table 1, and tested for adhesion after heat treatment as specified and one day aging.

TABLE 1

| | Tin Compound | | Amine | | Organic coating Substrate | Heat Treatment | Crosscut test (JIS k5400) |
|---|---|---|---|---|---|---|---|
| Example | name | Quantity (#) | Name | Quantity (#) | | | |
| 1 | DTL *1 | 3 | A-1120 *2 | 0.5 | Alyd Stove white enamel | 60° C. 24 hr | 10 |

TABLE 1-continued

| Example | Tin Compound name | Quantity (#) | Amine Name | Quantity (#) | Organic coating Substrate | Heat Treatment | Crosscut test (JIS k5400) |
|---|---|---|---|---|---|---|---|
| Ref. 1 | " | 3 | none | — | Alyd Stove white enamel | 60° C. 24 hr | 0 |
| 2 | Stann *3 ONJ-1F | 3 | A-1100 *4 A-187 | 1.0 | Lacquer Surfacer | 60° C. 50 min | 10 |
| Ref. 2 | Stann *3 ONJ-1F | 3 | none | — | Lacquer Surfacer | 60° C. 50 min | 4 |
| 3 | Stann *5 ONZ-20 | 3 | A-1120 *6 BO | 1.0 | Lacquer surfacer | 60° C. 50 min. | 10 |
| Ref. 3 | Stann *5 ONZ-20 | 3 | none | — | Lacquer surfacer | 60° C. 50 min. | 4 |
| 3 | Stann *7 JF-9B | 3 | A-1120 *8 Ethyl silicate | 1.0 | Cellophane | 110° C. 30 sec. | 10 |
| Ref 3A | Stann *7 JF-9B | 3 | None | — | " | 110° C. 30 sec. | 2 |
| 4 | OSnSi *9 | 3 | A-187 *10 ethylene-diamine | 0.5 | Alkyd Stove white enamel | 60° C. 40 min. | 10 |
| Ref. 4 | " | 3 | none | — | Alkyd Stove white enamel | 60° C. 40 min. | 0 |

Notes to Table 1.
# = quantity expressed in parts by weight based on 100 parts by weight of resin.
*1 = DTL = Dibutyl tin dilaurate;
*2 = A-1120 = $NH_2CH_2CH_2NHCH_2CH_2CH_2Si(OCH_3)_3$, made by Nippon Unicar Company, Ltd.
*3 = Stann ONJ-1F = a mixture of $(n\text{-}C_8H_{17})_2Sn(OCOCH=CHCOOR)_2$ and
$(n\text{-}C_8H_{17})_2Sn(SCH_2COOC_8H_{12}\text{—iso})$, wherein R = $C_4$-$C_{12}$, made by Sankyo Yuki Co, Ltd.
*4 = A-1100 and A-187 = reaction product at 70° C. for 3 hrs, of A-1100 = $(NH_2CH_2CH_2CH_2Si(OCH_2CH_3)_3)$ and
A-187 = $(CH_2\overset{\diagdown\ \ \diagup}{\underset{O}{\phantom{x}}}CHCH_2OCH_2CH_2CH_2CH_2Si(OCH_3)_3)$ A-1100, A-187, both made by Nippon Unicar Co, Ltd.
*5 = Stann ONZ-20 = $(n\text{-}C_8H_{17})_2Sn=S$, made by Sankyo Yuki Co, Ltd.
*6 = A-1120 and BO = reaction product at 70° C. for 3 hours, of A-1120 and butylene oxide. A-1120 made by Nippon Unicar Co.
*7 = Stann JF-9B = $(n\text{-}C_4H_9)_2Sn(SCH_2CH_2COOR)_2$ wherein R = $C_4$-$C_{12}$, made by Sankyo Yuki Co, Ltd.
*8 = A-1120, and ethyl silicate = partial hydrolyzate of A-1120 and ethyl silicate. A-1120 made by Nippon Unicar Co.
*9 = OSnSi = Reaction product at 170° C. for 4 hrs of ethyl silicate 40, and $(n\text{-}C_8H_{17})_2SnO$. The $(n\text{-}C_8H_{17})_2SnO$ was made by Sankyo Yuki Co, Ltd.
*10 = A-187 and ethylene diamine = reaction product at 70° C. for 3 hrs of A-187 and ethylene diamine. A-187 made by Nippon Unicar Co, Ltd. See *4 above for structure.

In the Table 1, reference examples are also shown, wherein the same conditions as for the working examples were used, except that there was no amine used. As can be seen from Table 1, the results are unexpectedly good, when the coating material of the invention were used on an organic surface, whereas the results for the reference examples are poor.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A curable composition comprising a blend consisting essentially of (A) a silyl group containing vinyl resin having a main chain consisting essentially of vinyl polymer and in one molecule at least one silicon atom connected to a hydrolyzable group on terminal or side chain; (B) a tin compound; and (C) an amine or a mixture of two or more amines having in one molecule at least one silicon atom connected to a hydrolyzable group, wherein said vinyl resin comprises 100 parts by weight; said tin compound comprises 0.01 to 10 parts by weight; and said amine or mixture of amines comprises 0.01 to 20 parts by weight.

2. The composition of claim 1, wherein said tin compound is an organotin compound of carboxylic acid type.

3. The composition of claim 1, wherein said tin compound is an organotin compound of mercaptide type having a Sn=S bond.

4. The composition of claim 1, wherein said tin compound is an organotin compound of sulfide type having a Sn=S bond.

5. The composition of claim 1, wherein said amine is a silane coupling agent containing an amino group.

6. The composition of claim 1, wherein said amine is a reaction product of a silane coupling agent containing an amino group and a silane coupling agent containing an epoxy group.

7. The composition of claim 1, wherein said amine is a reaction product of a silane coupling agent containing an amino group and a compound containing an epoxy group.

8. The composition of claim 1, wherein said amine is a reaction product of a silane containing an epoxy group and an amine.

9. The composition of claim 1, wherein said amine is partial-hydrolyzates of silane coupling agent containing an amino group and a compound containing a hydrolyzable group.

10. The composition of claim 1, wherein said tin compound comprises 0.1 to 8 parts by weight.

11. The composition of claim 1, wherein said amine or mixture of amines comprises 0.1 to 15 parts by weight.

* * * * *